United States Patent [19]

Jacobs et al.

[11] 3,786,197

[45] Jan. 15, 1974

[54] PREFERENCE CIRCUIT FOR A MARKER

[75] Inventors: Melvin A. Jacobs, Hinsdale; David Q. Lee, Chicago, both of Ill.

[73] Assignee: GTE Automatic Electric Laboratories Incorporated, Northlake, Ill.

[22] Filed: Nov. 2, 1972

[21] Appl. No.: 303,184

[52] U.S. Cl. .......................................... 179/18 EB

[51] Int. Cl. .......................................... H04q 3/42

[58] Field of Search .................... 179/18 EB, 18 EK, 179/18 D, 18 FF

[56] References Cited

UNITED STATES PATENTS 2,768,240 10/1956 Leonard .......................... 179/18 FF

*Primary Examiner*—William C. Cooper

*Attorney*—Robert J. Black

[57] ABSTRACT

A preference circuit within a marker for a common control electronic communication system which, upon simultaneous seizure attempts, automatically inhibits the seizure of the marker by one of a pair of assigners and selects the other one thereof for service.

5 Claims, 1 Drawing Figure

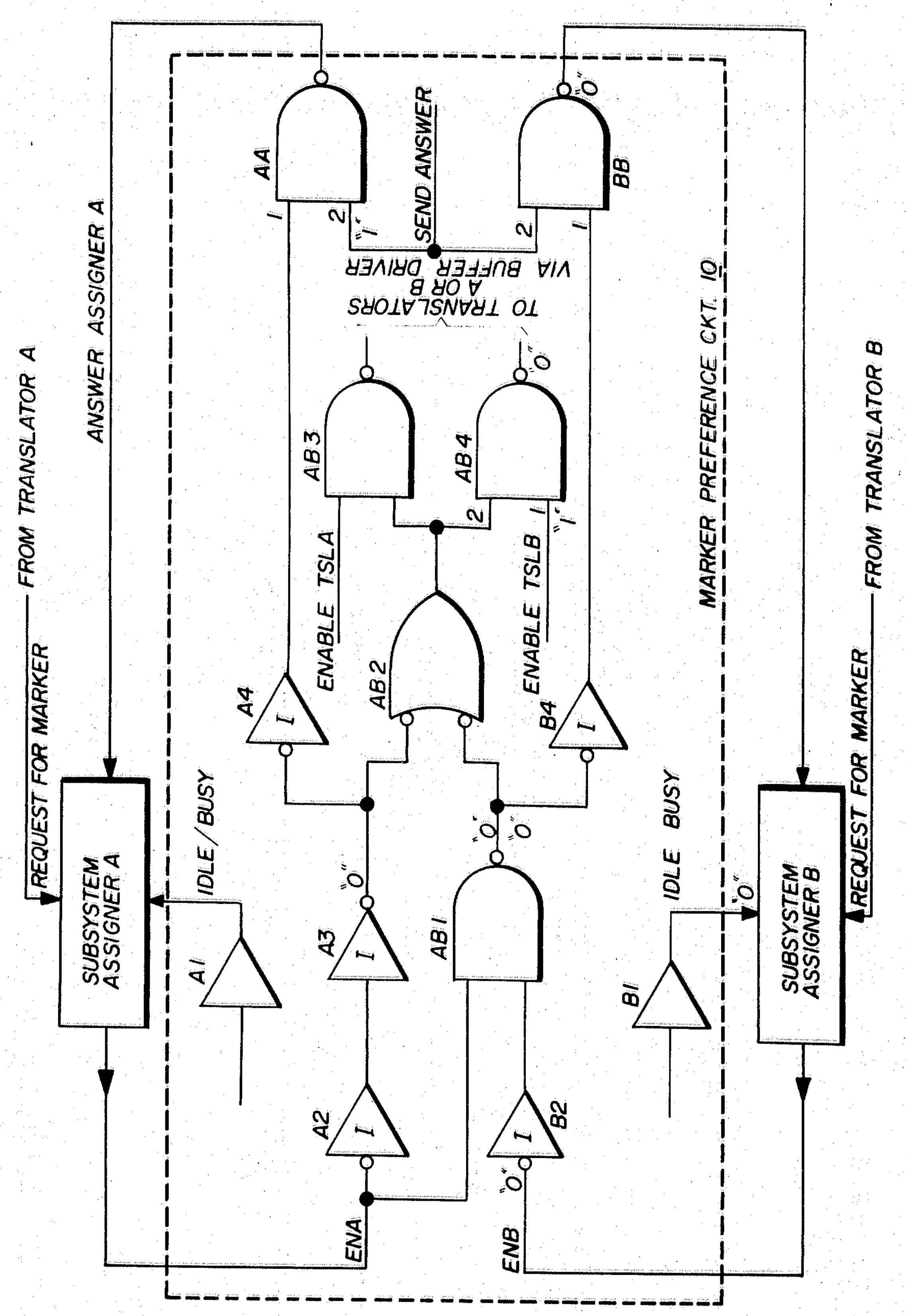
FROM TRANSLATOR A
REQUEST FOR MARKER
ANSWER ASSIGNER A
SUBSYSTEM ASSIGNER A
IDLE / BUSY
A1
A2
A3
A4
AA
AB1
AB2
AB3
AB4
BB
B1
B2
B4
ENA
ENB
ENABLE TSLA
ENABLE TSLB
SEND ANSWER
TO TRANSLATORS A OR B VIA BUFFER DRIVER
MARKER PREFERENCE CKT. 10
IDLE BUSY
SUBSYSTEM ASSIGNER B
REQUEST FOR MARKER
FROM TRANSLATOR B

PREFERENCE CIRCUIT FOR A MARKER

BACKGROUND OF THE INVENTION

This invention relates to an improved marker for a common control electronic communication system and, more particularly, to a preference circuit within a marker which upon simultaneous seizure attempts automatically inhibits the seizure of the marker by one of a pair of assigners and selects the other one thereof for service.

In a common control electronic communication system, a marker selects, tests and connects an idle matrix path between the trunk of the incoming call to an outgoing trunk of the designated route. The physical location of the trunks are provided to the marker by a translator.

The translator, when it has received sufficient called data from a register-sender, decodes the data to the inlet trunk location, and locates idle outgoing trunks to the designated route. The translator then sends a request to an assigner for an idle marker. The assigner scans the busy/idle leads of the markers and ignores all leads with busy signals, then selects the first marker that indicates idle. This marker is enabled by the assigner, and is connected to the requesting translator.

The markers within the system serve at least a pair of translators, each of which has an assigner associated with it for seizing the marker and connecting it to its associated translator. The marker, in its "ready to service" state, will indicate idle to both assigners. Should both assigners select and enable the same marker, the received composite information will show as invalid data to the marker, therefore, neither translator can be served by the marker and two incoming calls could be lost.

Accordingly, it is an object of the present invention to provide within a marker a preference circuit which upon simultaneous seizure attempts automatically inhibits the seizure of the marker by one of a pair of assigners and selects the other one thereof for service.

A further object is to provide such a preference circuit wherein no delay circuits are used so that normal marker operation is not delayed or hindered.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which:

FIG. 1 is a block diagram schematic illustrating the preference circuit within a marker, and the manner in which it operates.

DESCRIPTION OF THE PREFERRED EMBODIMENT

As indicated above, when a translator has received and decoded the incoming data from a register-sender, it then selects idle outgoing trunks to the designated route and requests to its associated assigner for an idle marker. Each marker serves at least two translators and, in its call process state, will indicate busy to both assigners associated with these translators, and will show idle when available for service.

If more than one marker indicates idle, the assigner via its scan circuit selects one of them and transfers the translator identity to it. When the assigner receives confirm signals from the marker and translator, it transmits a series of enable pulses to the marker and translator, thus gating the decoded data from the translator to the marker. This data, called Call Switching Data, in two out of five form, includes the physical location of the incoming trunk and locations of idle outgoing trunks. The marker parity checks the incoming data for validity and uses this information to select and connect an idle path in the matrix between the two trunks.

The common control system can handle two or more incoming calls simultaneously, and each translator associated with a marker can request the marker for service via its associated assigners. If the assigners associated with the two translators select and enable the marker, then the combined data from the two translators will be received and parity checked by the marker. Since the combined data will fail the two out of five validity check, the marker will notify the trouble recorder and release itself from the cell.

The marker preference circuit of the present invention eliminates double seizure problems by automatically inhibiting the seizure of the marker by one of the assigners and by selecting the other one thereof for service, upon simultaneous seizure attempts by the two assigners. The manner in which this is accomplished can be seen in the drawing, wherein the marker preference circuit 10 within the marker is illustrated. In the illustrated embodiment, the marker services two translators A and B (not shown) having assigners A and B associated with them, respectively. When the marker is idle, a logic "0" signal is present on each of the idle/-busy leads to the respective assigners A and B, via the inverter drivers A1 and B1. A logic "1" signal on these idle/busy leads indicates the marker is in call process, or not available for service.

For the purpose of describing the operation of the marker preference circuit 10, assume that the translator B requires a marker. The translator B then sends a "request for marker" signal to the assigner B. The assigner B initiates its scan circuits to the idle/busy leads of the markers and the first logic "0" signal detected stops the scan circuit. The assigner B then places a logic "0" signal on the lead ENB to the inverter B2. The NAND gate AB1 therefore will see at its input 2 a logic "1" signal from the output of the inverter B2. The assigner A not having received a "request for marker" signal outputs a logic "1" signal to the input 1 of the NAND gate AB1. The output from the NAND gate AB1 is a logic "0" signal, to the inverter B4 and to the NOR gate AB2. The logic "1" signal from the assigner A also is coupled to the inverter A2 and the logic "0" signal output from the inverter A2 is coupled to the inverter A3 which again inverts the signal to couple a logic "1" signal to the NOR gate AB2. The output of a NOR gate AB2 places a logic "1" signal to the input 2 of both NAND gates AB3 and AB4, for reasons described more fully below.

The inverter B4 inverts the logic "0" signal output from the NAND gate AB1 and provides a logic "1" signal to the input 1 of the NAND gate BB. The logic "1" signal output from the inverter A3 is coupled to the inverter A4, and the latter provides a logic "0" signal to the input 1 of the NAND gate AA.

When the marker signals "send answer", a logic "1" signal is placed on input 2 of both NAND gates AA and BB. The coincidence of the logic "1" signals on both inputs 1 and 2 of the NAND gate BB enables the latter and it places a logic "0" signal (answer) on the answer assigner B lead to the assigner B. When the assigner B receives this answer signal, it forwards translator B's identity to the marker which decodes the identity information and places a logic "1" signal on lead ENABLE TSLB to the input 1 of the NAND gate AB4. Since a logic "1" signal is present on the input 2 of the NAND gate AB4, a logic "0" signal is outputed to the buffer driver circuits to activate the data highway between the marker and the translator B, to couple the marker to the translator B.

The logic "0" signal on the input 1 of the NAND gate AA during the receipt of the send answer logic "1" signal from the marker inhibits the NAND gate AA to output the answer signal to the assigner A. Accordingly, when the translator B sends the "request for marker" signal to the assigner B, the marker preference circuit 10 operates to connect the marker to the translator B.

Identical operations are performed by the marker preference circuit when the assigner A receives a "request for marker" signal from the translator A. In this case, however, the inverters A2, A3 and A4 will present a logic "1" signal to the input 1 of the NAND gate AA so that the latter is enabled when the send answer logic "1" signal is received from the marker. The coincidence of these two signals at the inputs of the NAND gate AA will cause the latter to output the answer signal to the assigner A. When the assigner A receives the answer signal, it forwards translator A's identity to the marker and the latter decodes the identity information and places a logic "1" signal on the lead ENABLE TSLA to the input 1 of the NAND gate AB3. The NAND gate AB3 outputs a logic "0" signal to the buffer driver circuits to activate the data highway between the marker and the translator A, to couple the marker to the translator A.

If both the assigner A and assigner B receive a "request for marker" signal from their respective translators and simultaneously output a logic "0" signal to the marker preference circuit 10, the logic "0" signal from the assigner A on the input 1 of the NAND gate AB1 causes the latter to output the logic "1" signal to the inverter B4. The NAND gate BB, at its input 1, therefore sees a logic "0" signal and is thereby automatically inhibited to prevent the assigner B from seizing the marker. The logic "0" signal from the assigner A is inverted by the inverters A2, A3 and A4 to present a logic "1" signal to the input 1 of the NAND gate AA. The latter therefore is enabled when the send answer logic "1" signal from the marker is received on its input 2, to couple the answer signal to its assigner A to cause the marker to be coupled to the translator A. The marker reverts to its busy state, and the assigner B will initiate its marker scan circuit for an idle marker.

From the above description, it can be seen that the marker preference circuit 10 is operative to connect the marker to either the translator A or B when their associated assigners A and B receive a "request for marker" signal from the respective translators, at separate points of time. However, if the assigners A and B attempt to simultaneously seize the marker, the NAND gate BB is automatically inhibited to prevent the assigner B from seizing the marker, while the NAND gate AA is enabled to answer the assigner A to cause it to seize the marker. Accordingly, with the disclosed arrangement, the assigner A or translator A is provided with preferred service on simultaneous seizure attempts, while the assigner B or translator B is automatically inhibited during such occurrences.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a common control communication system including a marker for establishing a connection between a trunk of an incoming call to an outgoing trunk through a switching matrix, at least a pair of translators connectable to said marker for service, and a first and a second assigner associated with respective ones of said translators for seizing said marker, said marker including a preference circuit which upon simultaneous seizure attempts automatically inhibits the seizure of said marker by one of said assigners and selects the other one thereof for service, said preference circuit comprising an input logic gate, a first logic gate enabled by the coincidence of a plurality of signals including a logic signal from said input logic gate; a second logic gate enabled by the coincidence of a plurality of signals including a logic signal from said second assigner; said first assigner upon receiving a request for a marker coupling a logic signal to said input gate to enable it to send said logic signal to enable said first logic gate to couple an answer signal to said first assigner to seize said marker; said second assigner upon receiving a request for a marker coupling a logic signal to both said input logic gate and to said second logic gate, said second logic gate being enabled to couple an answer signal to said second assigner to seize said marker; said input logic gate upon simultaneously receiving said logic signals from both said first and second assigners being enabled and coupling a logic signal to said first logic gate to inhibit it and said second logic gate being enabled by said logic signal from said second assigner to couple said send answer signal to second assigner to seize said marker.

2. The communication system of claim 1, wherein said preference circuit further comprises a first and a second output logic gate associated respectively with one of said translators, said one of said first and second assigners receiving said answer signal coupling its associated translator's identity to said marker and said marker applying a logic signal to said one of said first and second output logic gates associated with said translator to couple said marker to said translator.

3. The communication system of claim 1, wherein said first logic gate is enabled by the coincidence of said logic signal from said input logic gate and a send answer signal from said marker; and said second logic gate is enabled by the coincidence of said logic signal from said second assigner and said send answer signal from said marker, said send answer signal being simultaneously coupled to both said first and second logic gates.

4. The communication system of claim 2, wherein said output logic signal from said input logic gate and said logic signal from said second assigner are coupled to a third logic gate which is enabled upon the receipt thereof in coincidence to couple an enabling logic signal to both said first and second output logic gates, said one of said first and second output logic gates being enabled upon the receipt of said logic signal from said marker in coincidence with said enabling logic signal to couple said marker to said translator.

5. The communication system of claim 4, wherein said first logic gate is enabled by the coincidence of said logic signal from said input logic gate and a send answer signal from said marker; and said second logic gate is enabled by the coincidence of said logic signal from said second assigner and said send answer signal from said marker, said send answer signal being simultaneously coupled to both said first and second logic gates.

* * * * *